United States Patent
Mönig et al.

(10) Patent No.: US 9,134,727 B2
(45) Date of Patent: Sep. 15, 2015

(54) METHOD FOR DISPLAYING INFORMATION FROM AN ID TRANSMITTER

(75) Inventors: Stefan Mönig, Schwelm (DE); Veit Schroter, Essen (DE); Helmut Schumacher, Coesfeld (DE); Jörg Simon, Wülfrath (DE)

(73) Assignee: HUF HUELSBECK & FUERST GMBH & CO. KG (DE)

( * ) Notice: Subject to any disclaimer, the term of this patent is extended or adjusted under 35 U.S.C. 154(b) by 785 days.

(21) Appl. No.: 13/254,038

(22) PCT Filed: Apr. 9, 2010

(86) PCT No.: PCT/EP2010/054682
§ 371 (c)(1),
(2), (4) Date: Aug. 31, 2011

(87) PCT Pub. No.: WO2010/115971
PCT Pub. Date: Oct. 14, 2010

(65) Prior Publication Data
US 2012/0015636 A1    Jan. 19, 2012

(30) Foreign Application Priority Data
Apr. 9, 2009  (DE) .......................... 10 2009 016 808

(51) Int. Cl.
*H04M 3/42*    (2006.01)
*G05B 23/02*    (2006.01)
(Continued)

(52) U.S. Cl.
CPC ........ *G05B 23/0218* (2013.01); *G07C 9/00309* (2013.01); *G07C 5/008* (2013.01); *G07C 5/0808* (2013.01); *G07C 2009/00769* (2013.01)

(58) Field of Classification Search
CPC ..... H04W 8/245; G08B 25/14; G08B 13/122; G08B 25/008

USPC .................. 340/500, 506, 541, 542, 340/539.11–539.19, 521, 531; 455/418, 455/419, 414.1, 41.1, 41.2
See application file for complete search history.

(56) References Cited

U.S. PATENT DOCUMENTS

2006/0114100 A1   6/2006   Ghabra et al.
2006/0125620 A1   6/2006   Smith et al.
(Continued)

FOREIGN PATENT DOCUMENTS

CN        1722621 A      1/2006
CN        201145952 Y   11/2008
(Continued)

OTHER PUBLICATIONS

Chinese Office Action dated Jun. 24, 2013 re: Chinese Application No. 201080015373.6; citing: US 2006/0125620 A1, CN 1722621 A, US 2006/0114100 A1 and CN 201145952 Y.
(Continued)

*Primary Examiner* — Wayne Cai
(74) *Attorney, Agent, or Firm* — Cantor Colburn LLP

(57) ABSTRACT

The invention relates to a method for displaying a piece of information, using a mobile ID transmitter (10) and a cellular telephone (20) having a display (21), wherein the mobile ID transmitter (10) is used to activate a security system of a motor vehicle, the mobile ID transmitter (10) has an electronics unit (11), the electronics unit (11) is used for data communication (30) with a vehicle-side device, a vehicle-side piece of information is transmitted from the vehicle-side device to the electronics unit (11) by means of the data communication (30), the vehicle-side piece of information is stored in a data memory (12), the electronics unit (11) communicates with the cellular telephone (20) by means of a communication connection (40), and the vehicle-side piece of information is transferred to the cellular telephone (20) by means of the communication connection (40) and displayed there by means of the display (21). Furthermore, the invention is also directed at a system for displaying a vehicle-side piece of information on a cellular telephone (20) by means of a mobile ID transmitter (10) and also only at an ID transmitter.

18 Claims, 3 Drawing Sheets

(51) Int. Cl.
*G07C 9/00* (2006.01)
*G07C 5/00* (2006.01)
*G07C 5/08* (2006.01)

(56) References Cited

U.S. PATENT DOCUMENTS

| | | | | |
|---|---|---|---|---|
| 2006/0294429 | A1* | 12/2006 | Natsume | 714/31 |
| 2009/0079555 | A1* | 3/2009 | Aguirre De Carcer et al. | 340/441 |
| 2010/0117868 | A1* | 5/2010 | Van Wiemeersch et al. | 340/989 |
| 2010/0256861 | A1* | 10/2010 | Hodges | 701/33 |

FOREIGN PATENT DOCUMENTS

| | | |
|---|---|---|
| DE | 19545888 A1 | 6/1997 |
| DE | 19917817 A | 10/2000 |
| DE | 10244654 A1 | 2/2004 |
| DE | 10244004 A1 | 4/2004 |
| DE | 10317499 A1 | 11/2004 |
| DE | 10321548 B4 | 12/2004 |
| DE | 202005001972 A1 | 5/2005 |
| DE | 102004025886 A1 | 12/2005 |
| DE | 102004050846 A1 | 4/2006 |
| DE | 102006018831 A1 | 10/2007 |
| DE | 102006042312 A1 | 3/2008 |
| DE | 102007060609 A1 | 6/2009 |
| DE | 102008026676 A1 | 12/2009 |
| EP | 1609932 A1 | 12/2005 |
| EP | 1638055 A2 | 3/2006 |
| EP | 2048629 A2 | 4/2009 |

OTHER PUBLICATIONS

German Search Report issued Jan. 21, 2010 re: Application No. 10 2009 016 808.7; citing: DE 19917817 A1, DE 10244004 A1, DE 102008026676 A1, DE 102007060609 A1, DE 10321548 B4, DE 102004025886 A1, DE 10317499 A1, DE 10244654 A1, DE 202005001972 U1, DE 102006018831 A1, DE 19545888 A1 and DE 102006042312 A1.

International Search Report issued Sep. 6, 2010 by European Patent Office re: PCT/EP2010/054682; citing EP 1638055 A2; DE 102004050846 A1; US 2006/114100 A1 and EP 1609932 A1.

* cited by examiner

METHOD FOR DISPLAYING INFORMATION FROM AN ID TRANSMITTER

TECHNICAL FIELD

The invention concerns a method for display of information, a system for display of information, and a mobile ID transmitter.

BACKGROUND

Modern motor vehicles often have a number of electronic systems, like speedometer, engine management, navigation and/or safety systems. These electronic systems are generally connected to each other by a bus system, for example, a CAN-bus, and are monitored by a computer unit within the vehicle. It is therefore possible for a user sitting in the vehicle to have a variety of information displayed from the individual electronic systems. However, it turned out to be a drawback that this information cannot be transmitted, or only transmitted very awkwardly, from the vehicle to an electronic data processing element. For example, during a visit to the workshop, an employee must often write out the information by hand and compare it with tables in order to be able to make a statement concerning the present status of the vehicle, especially the electronics systems.

Mobile identification transmitters, also called ID transmitters below, are used in numerous applications in vehicles to increase operator comfort and to increase theft security. Infrared systems or radio systems are ordinarily used, in which the authorized user operates a key on the ID transmitter, in order to transmit a signal to the base station, for example, a transmitter and receiving unit provided in the vehicle, to lock and/or unlock the vehicle lock. After corresponding activation of the ID transmitter, which is also known as an electronic key, data communication occurs between the ID transmitter and the lock, in which a code is exchanged, preferably via electromagnetic waves, so that after a positive evaluation of the keyed code, for example, the doors, trunk lid of the vehicle can be remotely unlocked and/or locked and additional functions can be initiated. Likewise the ID transmitter may also be integrated in a so-called "Passive-Keyless-Go"-Safety system so that activation of the ID transmitter is not required. Furthermore the vehicle can recognize on its own that the ID transmitter is in its vicinity upon which the above mentioned data communication takes place automatically.

BRIEF SUMMARY

The present invention seeks to provide a method, a system and/or an ID transmitter for the display of information that overcomes the mentioned drawbacks, and especially permits display of information of a vehicle outside the vehicle in a simple manner. Furthermore the present invention also seeks to provide this information in such a way that they can be used for further processing.

The invention provides a method for display of information. The invention also provides a system with a mobile ID transmitter such as a cellular phone with a display unit. Furthermore the invention provides a mobile ID transmitter. Features and details described in conjunction with the method according to the invention also apply in conjunction with the system according to the invention and the mobile ID transmitter and vice versa.

The invention more particularly provides a method for display of information whereas mobile ID transmitter such as cellular phone with a display and a vehicle-side device are basically used as hardware. The mobile ID transmitter is used to activate a security system of a vehicle and/or to activate the immobilizer or similar thing. Furthermore the mobile identification transmitter has an electronic unit which is used for data communication with a part in the vehicle. Vehicle-side information is transmitted from the vehicle-side device to the electronic unit via data communication which is then stored in a data memory of the ID transmitter. The electronic unit of the ID transmitter can communicate with the cellular phone via a communication connection and the vehicle-side information is transmitted via the communication connection to the cellular phone and displayed there.

The main idea of the invention is based on the fact that the information occurring in the vehicle is stored on the mobile identification transmitter. In conjunction with this, it is possible for the user to display the vehicle-side information in any place—thus even outside the vehicle—on his cellular phone that is not part of the mobile ID transmitter. To do this, the electronic unit transmits the vehicle-side information to be displayed via the communication connection. It is therefore possible at any time for the user to display the vehicle-side information on his cellular phone or another cellular phone and check it. This method is particularly advantageous in order to monitor a number of vehicles, as is the case at a car rental agency or company car pool. Only transmission of the vehicle-side information according to the invention to the business cellular phone is necessary in order to monitor the status of individual vehicles and provide for evaluation purposes. Even for a private person it is especially simple to query for fuel level, kilometer status, light and/or lock status, next maintenance schedule or the tire pressure from outside the vehicle.

Furthermore, it is feasible that the vehicle-side information in the cellular phone are communicated to a vehicle workshop, the manufacturer or rental company of the vehicle via radio transmission. As a result, vehicle-side information can be conveyed in a simple way to do a detailed error and/or vehicle analysis outside the vehicle or even without the vehicle.

In the context of an advantageous embodiment of the method according to the invention, it is proposed that the mobile ID transmitter transmits a query sequence, in which case the cellular phone receives the query sequence and transmits a response sequence to make the communication connection. In order to save power, the query sequence takes place in larger time intervals than the data exchange. A transmission format for the vehicle-side information can be transmitted in the response sequence. In the context of this alternating question and answer sequence, the requirements to display the vehicle-side information on the cellular phone are created to display the vehicle-side information on the cellular phone, more precisely on the display unit of the cellular phone. The query sequence can lead to execution of the computer program on the cellular phone. This computer program ensures that the vehicle-side information sent by the mobile ID transmitter is received by the cellular phone and displayed accordingly. In addition, different communication interfaces of a cellular phone can be addressed in parallel by the query sequence. From this number of possibilities, the cellular phone chooses a corresponding transmission format with the interface setup for it and transmits the corresponding transmission format in the response sequence to the mobile ID transmitter. It is then possible for anyone to adapt the vehicle-side information to the desired transmission format and transmit to the cellular phone. This has the advantage that a user of the method according to the invention can use any cellular phone available to him, in order to display the vehicle-side information. The user does not have to rely on a preinstalled cellular phone, especially those marketed by the manufacturer of the vehicle.

It is also feasible that a small program is transmitted to the cellular phone from the ID transmitter after establishing a communication for the first time, which will be then used for the display and management of corresponding vehicle-side information by the cellular phone. The program transmitted by the ID transmitter can be stored in a freely programmable module in the cellular phone so that it need not be transmitted again to the cellular phone when a communication is established each time. The corresponding program may also be transferred to the cellular phone as a download or through SMS or similar. This program is stored in the ID transmitter in a freely programmable module of the electronic unit so that this program can be changed, even by the vehicle manufacturer or the manufacturer of the ID transmitter.

Likewise it can also be planned that after the communication is established for the first time between the ID transmitter and the cellular phone, a security code—also called a PIN—is defined so that data exchange is possible only between the two predefined units (ID transmitter and cellular phone). The respective security code can be defined or exchanged in accordance with the AES standard. As an option it can also be planned that only an encrypted data exchange take place in the communication. If required, the ID transmitter can communicate with more than one cellular phone, even if a security code has to be defined for each connection.

Since a user can access a number of cellular phones in order to display the vehicle-side information, another advantageous variant of the method according to the invention is characterized by the fact that, after transmission of the query sequence, the method also comprises the following steps:
 a number of types of independent display units receive a query sequence and send a response sequence,
 the mobile identification transmitter receives a number of response sequences,
 the mobile identification transmitter selects an independent display unit by means of a priority list, and
 the mobile identification transmitter transmits the vehicle-side information to the selected independent display unit.

The advantage of this variant is that it can be defined beforehand on which cellular phone the set information is to be displayed. For example a special type of cellular phone can be chosen depending on the type of vehicle-side information. On the other hand, it is also possible to mark a number of cellular phones of the same type with an internal code. The ID transmitter, according to the invention, is then capable of selecting the cellular phone and transmitting the vehicle-side information only to this cellular phone. This type of method, according to the invention, has proven to be particularly advantageous in the context of management of large fleets of vehicles. The mobile ID transmitters for the different vehicles can be issued at a central vehicle location and later collected again. Depending on different vehicle classes, it is possible to display the vehicle-side information on pre-established cellular phones. Thus, a simple comparison of individual vehicle classes, like trucks or passenger cars, is possible in the central vehicle location.

At this juncture it should be mentioned that in the present text a mobile telecommunication part should be understood under a cellular phone which has a radio unit and with which a data transmission into a wireless telecommunication network (GSM, UMTS or similar) is possible. Therefore in the sense of this invention a cellular phone may also include a PDA with radio unit, a Black Berry© or similar.

In contrast to the variant described above, another variant of the method, according to the invention, is characterized by the fact that the cellular phone transmits a query sequence, in which the mobile ID transmitter receives the query sequence and sends a response sequence. In contrast to the previous method, the query sequence is not sent by the mobile ID transmitter, but by the cellular phone.

The mobile ID transmitter responds after receipt of the query sequence and can then transmit a number of transmission formats, among which the cellular phone can choose. As an alternative, the cellular phone, in the context of the query sequence, can already transmit the desired transmission format for the vehicle-side information.

Another advantageous variant of the method according to the invention is characterized by the fact that a variety of vehicle-side information is transmitted via data communication from a number of vehicle-side devices to the electronic unit, especially that the mobile ID transmitter, depending on the type of cellular phone, transmits different vehicle-side information by means of the communication connection. Depending on the requirement, it is possible for the mobile ID transmitter to store or transmit only some vehicle-side information or most of it. Very different vehicle-side devices can therefore also be monitored by means of the method according to the invention.

In particular, it is possible to monitor at least one of the following vehicle-side devices: a lock system, an odometer, an error memory, a vehicle bus system, a navigation system, a heater, especially a parking heater, a parking system, a car radion, a vehicle or engine management system, a main computer in the vehicle or the like. Each of the listed vehicle-side devices sends information concerning its current status to the central vehicle control. By making contact between the mobile ID transmitter and the vehicle, especially in conjunction with activation of the security system, this vehicle-side information is transmitted to the electronic unit and stored there. It is therefore ensured that the vehicle-side information is only transmitted to the mobile ID transmitter if it has been clearly defined beforehand. After checking authorization, the vehicle-side information is made available to the mobile ID transmitter. In conjunction with transmission, it is possible for the user to seek out any cellular phone and have the state of the vehicle displayed there, independently from the vehicle. Vehicle mileage, tank content, locking- and/or illumination state, maintenance content or content of an error memory can be displayed on the cellular phone. It is also conceivable that the user can have the information called up by a cellular phone and transfer the vehicle-side information, particularly via a wireless telecommunication network, to a workshop. Any inspection dates and service materials can thus be ordered beforehand.

Likewise the cellular phone can also be used, for example, to send vehicle-side information such as location of the vehicle, number of occupants and/or released airbags, crash speed immediately and independently after an accident or crash to an emergency center or a hospital, rescue service or similar with the help of wireless telecommunication network.

In order to transmit the query sequence, an activation element can be arranged on the ID transmitter. It is therefore possible for a user of the method, according to the invention, to carry out transmission of the vehicle-side information only when this is desired. By triggering the activation element, the corresponding formatted query sequence is sent to the cellular phone, on which the vehicle-side information is then displayed, according to the method of the invention.

In an advantageous variant of the method, according to the invention, the cellular phone stores and/or processes the vehicle-side information. The vehicle-side information can then be evaluated with mathematical methods and/or compared with a reference value. As an alternative, it is also possible to compare the vehicle-side information with a reference interval. The limits of the reference interval then correspond to stipulated parameters, within which the vehicle-side information should lie. For example, the engine temperature could be checked whether it surpasses or falls short of a stipulated limit value. If surpassing of the limits of the reference interval is present, the display unit can display a warning signal. It is thus easily possible for a user to recognize any deviations and/or errors of the vehicle in a timely fashion and issue a corresponding repair order.

Another variant of the method according to the invention is characterized by the fact that the cellular phone sends an information sequence to the mobile identification transmitter. In the context of the information sequence, instructions are transmitted from the cellular phone to the mobile identification transmitter. The information sequence can also contain a computer program, which is processed on the mobile ID transmitter. The computer program can be loaded in the electronic unit and processed and/or executed there. It is also possible for the information sequence to be transmitted from the mobile ID transmitter to a data processing system of the vehicle. In this case, the mobile identification transmitter acts as a data memory. The information sequence so transmitted can be integrated and/or processed in the data processing system of the vehicle. Thus, it has proven advantageous, if the information sequence includes limit values and/or instructions that can be processed, for example, in the engine management of the vehicle. It is possible, on this account, to adapt a vehicle at any time to changing external conditions, for example, summer or winter. Through this embodiment of the method according to the invention not only values and information can be transmitted from the vehicle to the cellular phone, but also information in the opposite direction. The information sequence can execute processing of the vehicle-side information in the data processing system of the vehicle before transmission to the mobile ID transmitter. Because of this, the vehicle-side information can already be compared beforehand with reference values and reference intervals. Only the vehicle-side information that deviates from or lies outside the reference values/intervals is then sent to the mobile ID transmitter.

The invention provides a computer program product for execution of the method according to one or more method claims, in which the process steps are integrated in a program stored in the computer program product.

In addition the above-mentioned task is also solved through a system for the display of information with a mobile ID transmitter as well as a cellular phone with a display.

The features mentioned in the context of the system according to the invention are also applicable in conjunction with the method, according to the invention, and vice versa.

The system, according to the invention, is characterized by the fact that the mobile ID transmitter communicates with a cellular phone and the informations received from the ID transmitter are announced on the display. The cellular phone consequently does not need to be delivered by the manufacturer of the vehicle or adapted in some other way beforehand to communication with the mobile identification transmitter. It is only necessary that a communication connection can be made between the mobile ID transmitter and the cellular phone and the vehicle-side information can be transmitted from the mobile identification transmitter to the cellular phone. Advantageously, the cellular phone is at least a part of the following elements: a personal digital assistant with radio unit, a notebook with radio unit, a personal computer with radio unit or a navigation system with a radio unit.

In order to produce a communication connection between the mobile ID transmitter and the cellular phone, the former can have a communications device. This communication device is a transmitter/receiver unit designed for uni- or bidirectional transmission of the vehicle-side information. In particular, the transmitting/receiving unit can be the transponder. The identification transmitter according to the invention is primarily used for activation of a security system of the vehicle. This type of mobile identification transmitter has a transponder that is used to transmit a code to the security system. As an alternative, the transponder serves to modulate an electromagnetic wave emitted by the security system, so that distinct identification of the mobile ID transmitter is possible. By using this transponder as a communication device, the components can be saved and the method according to the invention can be implemented inexpensively. The electronic unit can store the vehicle-side information and produce the communication connection to the cellular phone by transmitting a correspondingly modulated electromagnetic wave by means of the transponder. The cellular phone can have a communication element, in which the communication element is used to make a communication connection to the mobile ID transmitter. The communication element can be a transmitter/receiver unit equipped similarly to the communication device.

Likewise, it is also feasible that the power is transferable between the cellular phone or the vehicle and the ID transmitter via communication element and the communication medium or optionally provided spools. Here it has proven to be purposeful that the ID transmitter receives power as a rule and uses this for sending and receiving the vehicle-side information. Therefore it is also feasible that the ID transmitter has two separate power sources. Here the first source of power serves as electrical supply for operating the security system and the second source of power for the electrical supply of the communication element, and for example, the electronic unit, so that a data exchange between the ID transmitter and the cellular phone is possible. Through the separate power supply it can be ensured that the ID transmitter has its complete functionality for the security system of the vehicle, even if the second source of power is used. Both of the power sources or only one can be recharged either through the power supply of the cellular phone or the vehicle. For this purpose the respective sources of power may have a battery, a Gold-Kap or one or several capacitors. Likewise instead of rechargeable power sources, even batteries can be used where a Lithium battery is suitable as first source of power, which has long periods of use. A standard button battery can be used as second source of power. In spite of the use of batteries, it is feasible that power is transmitted to the ID transmitter from outside. This power may also come from the vehicle.

To ensure that the vehicle is ready for use, even if the power sources in the ID transmitter are exhausted, the ID transmitter can also have an additional mechanical emergency key. With this emergency key the security system or if required the immobilizer or similar of the vehicle can be activated manually.

The communication connection between the cellular phone and the mobile ID transmitter permits uni- and/or bidirectional exchange of vehicle-side information. It has then proven advantageous, if the communication device and/or the communication element has one of the following technologies: Bluetooth, Infrared Data Association (IrDA), ZigBee, Near Field Communication, Wireless Local Area Network (WLAN; IEEE 802.11), WiMAX, Wibree, FireWire (IEEE 1394), USB (Universal Serial Bus), HDMI (High Definition Multimedia Interface), Unilink, ATA/ATAPI (Advanced Technology Attachment with Packet Interface), IEEE 488, IEEE 1284, or a standard according to IEEE 802 or capacitive data transmission. Most of the mentioned technologies permit a wireless communication connection to be made between the two elements of the system. Such types of wireless communication connections have proven to be particularly user-friendly, since no additional aids, like cables, are necessary in order to execute the method according to the invention on the system, according to the invention. Likewise the data exchange between the ID transmitter and the cellular phone can also take place through electrical cable.

Additionally, it is also possible through the invention that the ID transmitter is searched and found with the help of the cellular phone where the cellular phone sends a search code and gives out acoustic and/or visual signals from itself, if the ID transmitter is in the vicinity. The signals become more frequent and/or louder when the cellular phone comes closer to the ID transmitter.

In an advantageous embodiment, it is proposed that the cellular phone uses a display with at least one of the following devices: a Light-Emitting Diode, an Organic Light-Emitting Diode (OLED), a Liquid Crystal Display or similar. A liquid crystal display is based on the use of special liquid crystals, which can influence the direction of polarization of light, in order to depict characters, symbols or images. Such LCD screens include a number of segments, in which orientation of liquid crystals can be individually controlled with an electrical field.

In the context of the invention disclosed here, it has proven advantageous that the described system is operated according to one of the methods described above.

The invention further provides a mobile ID transmitter for a security system of a vehicle with an electronic unit and a data memory, in which the electronic unit is used for data communication with a vehicle-side device, the vehicle-side information can be transmitted via data communication from the vehicle-side device to the electronic unit. It is proposed, according to the invention, that the vehicle-side information can be stored in the data memory, the electronic unit communicates with an independent display unit via a communication connection, in which the vehicle-side information can be transmitted to the cellular phone with display and displayed there via the communication connection.

Further advantageous variants of the present invention and the method are apparent from the corresponding dependent claims and the following description. With reference to the drawings, several practical examples of the invention are described in detail. Features and details that are described in conjunction with the method according to the invention then naturally also apply in conjunction with the system according to the invention and the mobile identification transmitter, and vice versa. In this case, the features mentioned in the claims and description can be essential to the invention individually or in any combination.

DETAILED DESCRIPTION

Figure 1:
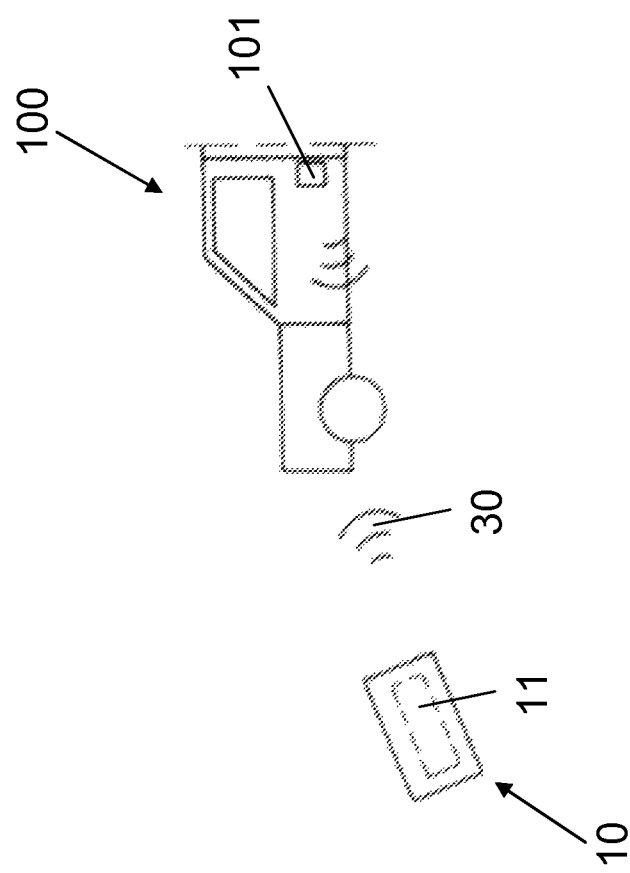
FIG. 1 a schematic view of a mobile ID transmitter, which is in data communication with a locking device of a vehicle, FIG. 2 the mobile ID transmitter according to the invention in communication connection with a cellular phone and FIG. 3 the mobile ID transmitter in communication connection with a cellular phone where the cellular phone does a data transfer with an emergency call center.

FIG. 1 schematically depicts a mobile ID transmitter 10, which is in communication with a security system 101 of a vehicle 100. The mobile ID transmitter 10 is used to execute predefined functions on vehicle 100. This is especially locking and/or unlocking of the closure system in the vehicle as well as the locking and/or unlocking of the anti-theft device and the engine management system respectively. For this system, the mobile ID transmitter 10 transmits a code to the security system 101. As shown in FIG. 1, this can occur via a wireless data communication 30. According to the invention, vehicle-side information is also sent via wireless data communication 30 to the mobile ID transmitter 10. Modern vehicles generally have a number of electronic systems that monitor the functions of vehicle 100. These can be an odometer, a GPS system, an ABS system, an air conditioner or an engine management system, a tire pressure device or the like. All the mentioned vehicle systems each determine vehicle-side information, which provide a conclusion concerning the status of vehicle 100. Sometimes it is possible to have the user of vehicle 100 displays the mentioned information on a dashboard. It has then proven to be a disadvantage that during an inspection of the vehicle or monitoring in the context of a fleet of vehicles, handwritten notation of the mentioned Vehicle-side information is required each time. In order to overcome this drawback, it is proposed, according to the invention, that the mobile ID transmitter 10 has an electronic unit 11 and the electronic unit 11 is used for data communication 30 with a vehicle-side device. The flow of vehicle-side information can occur, on the one hand, by direct data connection 30 between the mobile ID transmitter 10 and the vehicle-side device. For example, the ABS system can send its settings directly to the mobile ID transmitter 10. As an alternative, it is also possible that the vehicle-side information is first fed by means of a bus system to a central computer of the vehicle 100 and from there goes to the mobile ID transmitter 10 via the data communication 30. Regardless of whether direct or indirect data communication 30 is chosen, the mobile ID transmitter 10 stores the vehicle-side information in the data memory.

Figure 2:
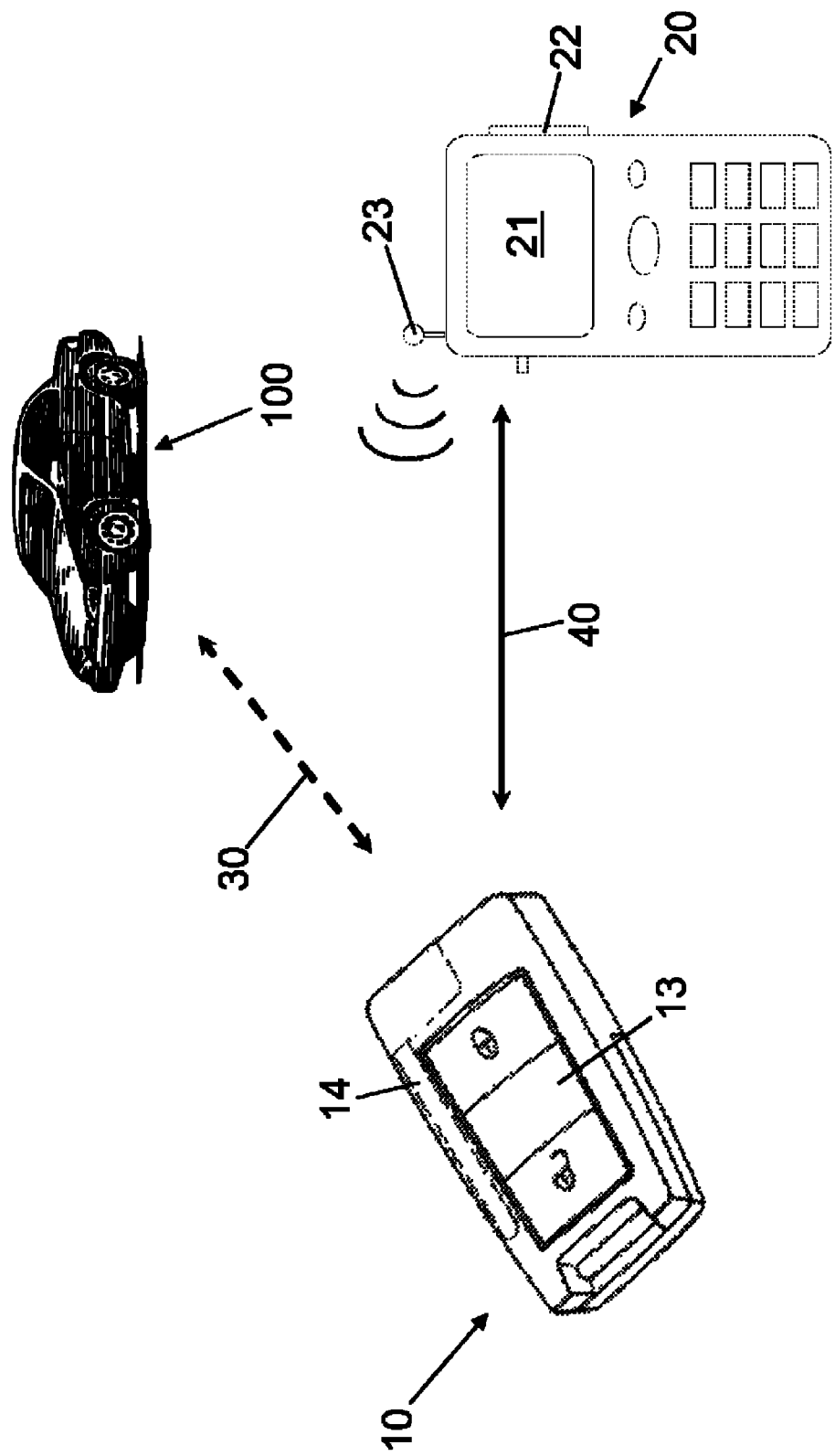

As shown in FIG. 2, it is possible, with the mobile ID transmitter 10, according to the invention, to communicate with a cellular phone 20 via communication connection 40. The vehicle-side information is transmitted via this communication connection 40 from the data memory of the mobile ID transmitter 10 to the cellular phone 20. The vehicle-side information is then displayed—if required with the help of the transferred program—on the display 21 of cellular phone 20. The method, according to the invention, as well as the mobile ID transmitter 10, according to the invention, consequently combine the possibility of transmitting the vehicle-side information transmitted from vehicle 100 to a cellular phone 20 not connected to the aforementioned mobile ID transmitter 10. In particular, it is proposed, according to the invention, that any cellular phones 20 can be used. Setup of drivers, in order to read out the information, is not required. However, it has proven advantageous to start a computer program on the cellular phone 20, which permits convenient display 21 of the vehicle-side information for the user. This computer program can be transferred from the ID transmitter to the cellular phone. It is also feasible that this program is transferable to the cellular phone through MMS, download or similar.

The starting point for the communication connection 40 between the mobile ID transmitter 10 and the cellular phone 20 is a query sequence. This is sent in one variant of the method according to the invention from the mobile ID transmitter 10. The cellular phone 20, which receives the query sequence, can answer with a response sequence to set up the communication connection 40. Such ad hoc communication connections 40 can be implemented, for example, by using Bluetooth interfaces. In addition, in the context of the response sequence, a transmission format for the vehicle-side information can be transmitted. The electronic unit 11 of the mobile ID transmitter 10 can adapt the vehicle-side information so that the cellular phone 20 can receive and display this information without a problem. The mobile ID transmitter 10 preferably sends a query sequence that informs the cellular phone 20 that a data memory would like to communicate with it. Such data memories are widely used nowadays, so that no pre-installation of additional drivers on the cellular phone 20 is required in order to permit communication connection 40.

In a purposeful way the method described above takes place in two stages, where in the first stage the query sequence is sent only in specified time i.e. not permanently but in specified time intervals until a response sequence is received. Then a permanent data exchange can take place in the second stage. Through this two-stage method the power requirement of the ID transmitter can be reduced significantly.

To set up the communication connection 40, the mobile ID transmitter 10 has a communication device 14. This communication device 14 is a transmitting/receiving unit integrated in the housing of the mobile ID transmitter 10. The cellular phone 20 also has a communication element 22, which is also designed as a transmitting/receiving unit. Through wireless transmission of electromagnetic waves between the communication device 14 and the communication element 22, the communication connection 40 is made and the vehicle-side information exchanged. This connection can also be used to transfer power from the cellular phone or the vehicle to the ID transmitter.

Moreover, the cellular phone 20 has an antenna 23 which can also be integrated in the device. With this antenna 23 the cellular phone 20 can establish an additional wireless connection into a public telecommunication network, for example.

Figure 3:
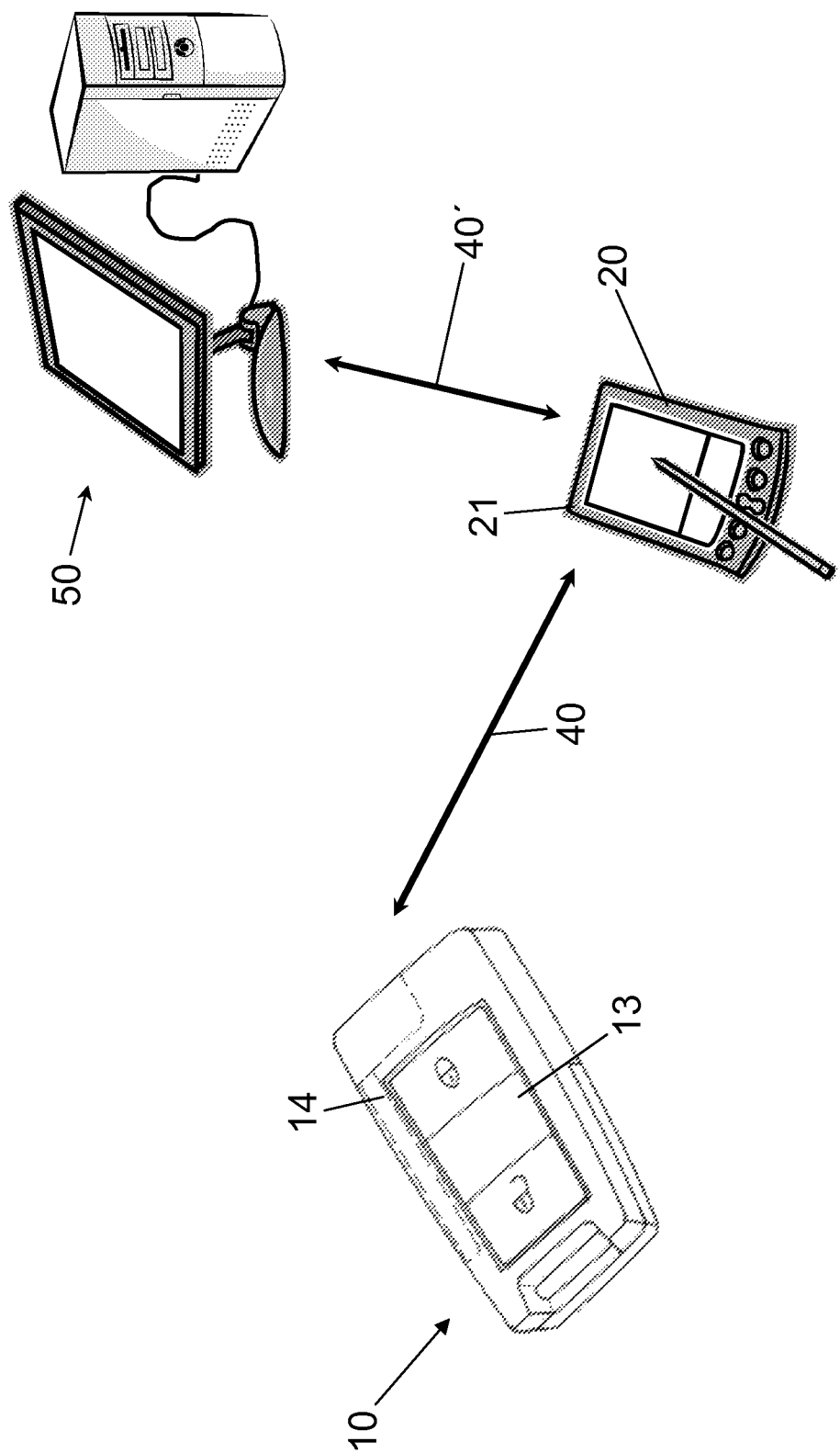

Another variant of the mobile ID transmitter 10 according to the invention is shown in FIG. 3. The mobile ID transmitter 10 has an activation element 13, on which the query sequence can be triggered. If a user activates the activation element 13, a communication device 14 sends the query sequence to the cellular phone 20 where a confirmation prompt may come up if required in which a PIN-Code is exchanged so that subsequent data exchange takes place only with the cellular phone authorized for it. The cellular phone receives the query sequence, processes it and, in turn, sends a response sequence via the communication element 22 upon which the previously described confirmation prompt is asked. As shown in FIG. 3, the mobile ID transmitter 10 can produce a communication connection 40 to the cellular phone 20, whereby the corresponding information between the ID transmitter 10 and the cellular phone 20 is compatible. Parallel with or sequential to it, it is also possible to make a second communication connection 40 between the cellular phone 20 and emergency call center 50 to directly provide information of an accident of the vehicle. Only the vehicle-side information can be sent to a workshop computer or a vehicle manufacturer or similar via this communication connection 40, where they can be forwarded in any way. Likewise, the information from the ID transmitter 10 can be communicated to a computer of the vehicle owner via communication connection 40 to be stored there and processed further with the help of standard software.

The invention claimed is:

1. Method for display of information, with a mobile ID transmitter and a cellular phone with a display, the method comprising:
   using the mobile ID transmitter for activation of a security system of a vehicle, wherein the mobile ID transmitter comprises an electronic unit;
   using the electronic unit for data communication with a vehicle-side device;
   transmitting vehicle-side information data communication from the vehicle to the electronic unit, storing the vehicle-side information in a data memory;
   communicating the electronic unit with the cellular phone via a communication connection; and
   transmitting the vehicle-side information via the communication connection to the cellular phone and displaying on the display,
   wherein the cellular phone transmits an information sequence to the mobile ID transmitter,
   wherein the information sequence is transmitted from the mobile ID transmitter to a data processing system of the vehicle,
   wherein that the mobile ID transmitter transmits a query sequence, in which the cellular phone receives the query sequence and sends a response sequence to make the communication connection, and wherein a transmission format for the vehicle-side information is transmitted in the response sequence.

2. Methods according to claim 1, wherein after sending the query sequence, the method further comprises: a number of types of cellular phone receiving the query sequence and sender response sequence, the mobile ID transmitter receiving the number of response sequences, the mobile ID transmitter selecting, by means of a priority list, a cellular phone, and the mobile ID transmitter transmitting to the selected cellular phone the vehicle-side information.

3. Method according to claim 1, wherein the cellular phone sends a query sequence, in which the mobile ID transmitter receives the query sequence and sends the response sequence.

4. Method according to claim 1, wherein a state of the vehicle is displayed on the display of the cellular phone, wherein the state comprises a mileage of the vehicle, a tank content, a maintenance interval, navigation data or a content of an error memory or similar and displayed on the display, wherein this information is forwarded to a wireless telecommunication network for further processing with the help of a cellular phone.

5. Method according to claim 1, wherein a variety of vehicle-side information is transmitted via the data communication to the electronic unit from a number of vehicle-side devices, and wherein the mobile ID transmitter transmits different vehicle-side information by means of the communication connection, to the cellular phone.

6. Method according to claim 1, wherein by triggering an activation element on the mobile ID transmitter, a query sequence is sent.

7. Method according to claim 1, wherein the cellular phone stores vehicle-side information and/or processes said vehicle-side information, wherein the cellular phone compares the vehicle-side information with a reference value, comprising a reference interval, wherein the cellular phone displays a warning signal when vehicle-side information lies outside the reference interval.

8. Method according to claim 1, wherein the information sequence is processed in the electronic unit.

9. Method according to claim 8, wherein the information sequence executes processing of the vehicle-side information in the data processing system of the vehicle before transmission to the mobile ID transmitter.

10. A non-transitory computer program product for execution of the method according to claim 1, wherein the method steps are integrated in a program stored in the computer program product.

11. System for display of information, comprising:
a mobile ID transmitter, and
a cellular phone with a display,
wherein the mobile ID transmitter is used to activate a security system of a vehicle, the mobile ID transmitter has an electronic unit and said electronic unit is used for data communication with a vehicle-side device, vehicle-side information can be transmitted via data communication from the vehicle-side device to the electronic unit, and said vehicle-side information can be stored in a data memory, the electronic unit communicates with the cellular phone via a communication connection, and the vehicle-side information can be transmitted via the communication connection to the cellular phone and displayed on the display,
wherein the cellular phone transmits an information sequence to the mobile ID transmitter,
wherein the information sequence is transmitted from the mobile ID transmitter to a data processing system of the vehicle,
wherein that the mobile ID transmitter transmits a query sequence, in which the cellular phone receives the query sequence and sends a response sequence to make the communication connection, and wherein a transmission format for the vehicle-side information is transmitted in the response sequence.

12. System according to claim 11, wherein the cellular phone comprises a part of the following: a personal digital assistant with radio, a notebook with a radio unit, a personal computer with a radio unit, or a navigation system with radio unit.

13. System according to claim 11, wherein the mobile ID transmitter has a communication device, by means of which the mobile ID transmitter makes the communication connection to the cellular phone.

14. System according to claim 11, wherein the communication device is a transponder, and wherein the transponder also serves to activate a security system of the vehicle.

15. System according to claim 11, wherein the cellular phone has a communication element, in which the communication element serves to make the communication connection to the mobile ID transmitter, and the communication element makes a wireless communication connection with the communication device.

16. System according to claim 15, wherein the communication device or the communication element comprises at least one of:
Bluetooth, Infrared Data Association (IrDA), ZigBee, Near Field Communication, Wireless Local Area Network (WLAN; IEEE 802.11), WiMax, Wibree, FireWire (IEEE 1394), USB (Universal Serial Bus), HDMI (High Definition Multimedia Interface), Unilink, ATA/ATAPI (Advanced Technology Attachment with Packet Interface), IEEE 488, IEEE 1284, a standard according to IEEE 802, and capacitive data transmission.

17. System for the display of information according to claim 11, is configured to:
use the mobile ID transmitter for activation of the security system of the vehicle;
use the electronic unit for data communication with the vehicle-side device;
enable a transmitting of the vehicle-side information data communication from the vehicle to the electronic unit;
store the vehicle-side information in the data memory;
enable communications between the electronic unit and the cellular phone via the communication connection; and
enable a transmitting of the vehicle-side information via the communication connection to the cellular phone.

18. Mobile ID transmitter for a vehicle security system, comprising:
an electronic unit and a data memory, wherein the electronic unit is used for data communication with a vehicle-side device, the vehicle-side information can be transmitted via data communication from the vehicle-side device to the electronic unit, the vehicle-side information can be stored in the data memory, the electronic unit communicates with a cellular phone with display via a communication connection, and whereby the vehicle-side information can be transmitted via the communication connection to the cellular phone and displayed on the display,
wherein that the mobile ID transmitter transmits a query sequence, in which the cellular phone receives the query sequence and sends a response sequence to make the communication connection, and wherein a transmission format for the vehicle-side information is transmitted in the response sequence.

* * * * *